(12) United States Patent
Belinski-Wolfe et al.

(10) Patent No.: US 7,261,838 B2
(45) Date of Patent: Aug. 28, 2007

(54) ELECTROLUMINESCENT PHOSPHOR

(75) Inventors: Judy A. Belinski-Wolfe, Towanda, PA (US); Brian J. Payne, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 280 days.

(21) Appl. No.: 10/905,321

(22) Filed: Dec. 28, 2004

(65) Prior Publication Data

US 2006/0138389 A1    Jun. 29, 2006

(51) Int. Cl.
*C09K 11/56*    (2006.01)
*C09K 11/54*    (2006.01)

(52) U.S. Cl. ............................................... 252/301.6 S

(58) Field of Classification Search .......... 252/301.6 S
See application file for complete search history.

(56) References Cited

U.S. PATENT DOCUMENTS 3,497,749 A  *  2/1970  Bushey ...................... 313/467

3,655,575 A       4/1972  Faria et al.
2002/0113226 A1  8/2002  Takehara et al.
2003/0230741 A1  12/2003 Fan et al.

FOREIGN PATENT DOCUMENTS

| EP | 1 006 170 B1 | 10/2003 |
|---|---|---|
| GB | 1088318 | 10/1967 |
| JP | 54-14666 | * 2/1979 |

OTHER PUBLICATIONS

*Abstract*, JP54-14666, Feb. 3, 1979.
A.J.Steckl et al., Multiple color capability from rare-earth doped gallium nitride, Materials Science and Engineering BS1 (2001) 97-101.

* cited by examiner

*Primary Examiner*—C. Melissa Koslow
(74) *Attorney, Agent, or Firm*—Robert F. Clark

(57) ABSTRACT

The electroluminescent phosphor of this invention is comprised of zinc sulfide activated with copper and iodine and may produce an emission with an x color coordinate from 0.145 to 0.155 and a y color coordinate from 0.085 to 0.095. The phosphor preferably contains from about 0.08 to about 0.90 weight percent (wt. %) copper.

5 Claims, No Drawings

ELECTROLUMINESCENT PHOSPHOR

TECHNICAL FIELD

This invention relates to zinc sulfide-based electroluminescent phosphors. More specifically, it relates to ZnS:Cu,I electroluminescent phosphors that emit light having a purple color.

BACKGROUND OF THE INVENTION

Electroluminescence (EL) is the emission of light under electric-field excitation. Based on this mechanism, EL lamps and displays are finding an increasing number of applications in the field of flat panel displays due to the growing demand for portable computers, communication equipment, and consumer electronic products. EL lamps also provide uniform light emission independent of viewing angle and they are insensitive to mechanical shock and vibration.

The two major EL lamp constructions are generally referred to as thin-film and thick-film. Thin-film EL lamps are made by depositing alternating thin layers of dielectric materials, phosphors and conductive oxides on a glass substrate using a vapor deposition technique such as CVD. By contrast, thick-film lamps are made by suspending powders in resinous materials and then applying them in layers onto a plastic film using conventional screen printing techniques. Hence, thick-film EL lamps can be thin, flexible and rugged thereby making them suitable for a wider range of lighting applications.

Most commonly, electroluminescent phosphors for thick-film applications are blue, blue-green, green or orange emitting. European Patent No. EP 1 006 170 B1 describes an electroluminescent phosphor with an emission spectrum having average CIE x,y color coordinates of 0.150 and 0.080, respectively.

SUMMARY OF THE INVENTION

As the markets for electroluminescent applications expand to require a wider variety of colors, the object of this invention is to provide an electroluminescent phosphor with a bluer emission color, i.e., higher y value, than the prior art purple-emitting phosphors.

In accordance an object of the invention, there is provided an electroluminescent phosphor that may produce an emission with an x color coordinate from 0.145 to 0.155 and a y color coordinate from 0.085 to 0.095. The phosphor is zinc sulfide-based and activated with copper and iodine, ZnS:Cu,I. Preferably, the CIE color coordinates (1931) range from 0.150 to 0.155 for the x coordinate and from 0.090 to 0.095 for the y coordinate.

DETAILED DESCRIPTION OF THE INVENTION

For a better understanding of the present invention, together with other and further objects, advantages and capabilities thereof, reference is made to the following disclosure and appended claims.

The electroluminescent phosphor of this invention is comprised of zinc sulfide activated with copper and iodine and may produce an emission with an x color coordinate from 0.145 to 0.155 and a y color coordinate from 0.085 to 0.095. The phosphor preferably contains from about 0.08 to about 0.90 weight percent (wt. %) copper. In a preferred method, ZnS powder is doped with a copper compound, such as $CuSO_4$ or CuI, in aqueous solution, mixed well and dried in a drying oven for at least 48 hours. This homogenous mixture is then blended with the appropriate amounts of ZnO, S, and an iodide-containing flux. The iodide-containing flux may be a mixture of alkali metal and alkaline earth iodides, e.g., $MgI_2$ and NaI. Preferably, the blend will contain 7 wt. % magnesium iodide and 1 wt. % sodium iodide.

In a first firing step, the blended mixture is fired in the air at a temperature from about 1020° C. to about 1100° C. for about 2 to about 3 hours. After quick cooling to room temperature, preferably accomplished by blowing compressed air directly on the crucible, the powder is water washed to remove the fluxes. The material is then worked to induce the defects, e.g., low intensity milling, mulling, or sonification.

The powder is then washed in seriatim with acid, a solution of NaOH, DTPA (diethylene triamine pentaacetic acid) and $H_2O_2$, and finally water to remove residual chemicals. After drying, the first-step material is blended with zinc oxide and a copper source, preferably copper sulfate. In particular, the first-step fired material is blended with 10-20 wt. % zinc oxide and 0.1-1 wt. % anhydrous copper sulfate. The mixture is blended and then fired in air in a second firing step for about 1.5 to about 3.5 hours at a temperature from about 650° C. to about 850° C. The cake is then cooled to room temperature outside of the furnace, water washed, and then washed again with HCl, the $NaOH\text{-}DTPA\text{-}H_2O_2$ solution, and water to remove any chemical residue. After drying, the powder is sifted to an appropriate size.

EXAMPLE 1

A 1.17-gram amount of anhydrous $CuSO_4$ was dissolved in a minimal amount of hot deionized (DI) water to which 550.0 grams of unchlorinated ZnS was added to form a slurry. The slurry was dried at a temperature of 110° C. for 48 hours. The dried mixture was blended together with 7 wt. % $MgI_2$, 1 wt. % NaI, and 8 wt. % S, and 0.5 wt. % ZnO. The blend was placed in covered crucibles and fired in a furnace at 1150° C. for 2.5 hours. The fired cake was taken out of the furnace, and cooled quickly with compressed air. The fired material was washed with hot DI water and dried. A 200-gram amount of the dried material was then mixed with DI water, treated ultrasonically for 30 minutes to induce defects in the crystal structure, filtered and dried.

The treated material was washed with HCl and then a solution of $DTPA\text{-}NaOH\text{-}H_2O_2$ (4 wt. % DTPA, 3.8 wt. % NaOH, 3 wt. % $H_2O_2$ (30% solution)). After four DI water washes, the material was dried at 110° C. for 12 hours and sifted through a 100-mesh screen. To the sifted material, 0.53 wt. % anhydrous $CuSO_4$ and 10 wt. % ZnO was added and the combined material re-blended. The re-blended materials were placed in covered crucibles and fired at 730° C. for 2.25 hours. The second-step fired material was washed twice with water, twice with hydrochloric acid, and then several times with hot DI water until the wash solution had a pH below 4. It was then washed with the solution of $DTPA\text{-}NaOH\text{-}H_2O_2$, further washed with DI water to remove residual chemicals and then filtered, dried and sifted through a 500-mesh stainless steel sieve to form the finished phosphor.

EXAMPLE 2

This phosphor was made similarly to Example 1 except 1.40 grams of CuI was used to make the ZnS slurry before first step firing.

The phosphors from Examples 1 and 2 were tested in conventional thick-film electroluminescent lamps operated at 100 V and 400 Hz in a 50% R.H, 70° F. environment. The test lamps are comprised of a ~40 μm-thick phosphor layer and an approximately 26 μm-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 50 wt. % and the percentage of phosphor after the binder-phosphor mix is dried is 80 wt. %. The phosphor suspension is blade coated onto a 0.007-0.0075 in.-thick PET film having a transparent, conductive layer of indium-tin oxide (ITO) (available from CPFilms). After drying, the barium titanate layer is applied over the phosphor layer in the same way using a suspension of barium titanate dispersed in the cyanoresin binder. In particular, the binder-barium titanate mix is made by mixing 375 g of cyanoresin binder solution, 375 g of barium titanate, and 82.5 g of dimethylformamide. The percentage of barium titanate in the binder after drying is 80 wt. %. A rear electrode comprised of a 50 to 80-μm thick graphite layer is applied to the dried barium titanate dielectric layer using a graphite suspension (Acheson Colloids). Lead wires are attached and the entire lamp is laminated with clear, flexible film (Aclam TC200 from Honeywell Corp.) which is applied to both sides. The lamps were operated for 24 hours prior to measuring their brightness in order to stabilize the lamps and obtain representative measurements. The photometric properties of the phosphors are given in the Table. Brightness as used herein means the brightness of the phosphor in a conventional thick-film electroluminescent lamp, which has been operated at 100 V and 400 Hz for 24 hours. Half-life is the time it takes for the brightness of the phosphor to reach ½ of its initial value. Efficacy is in lumens per watt (LPW).

TABLE

|  | x | y | Efficacy (LPW) | Half-life (hours) |
|---|---|---|---|---|
| Example 1 | 0.153 | 0.093 | 0.83 | 163 |
| Example 2 | 0.153 | 0.092 | 0.80 | 156 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. An electroluminescent phosphor having an emission with an x color coordinate from 0.145 to 0.155 and a y color coordinate from 0.085 to 0.095, wherein the phosphor is comprised of zinc sulfide activated with copper and iodine.

2. The electroluminescent phosphor of claim 1 wherein the y color coordinate is from 0.090 to 0.095.

3. The phosphor of claim 1 wherein the phosphor contains from about 0.08 to about 0.9 weight percent copper.

4. The electroluminescent phosphor of claim 2 wherein the x color coordinate is from 0.150 to 0.155.

5. The phosphor of claim 4 wherein the phosphor contains from about 0.08 to about 0.9 weight percent copper.

* * * * *